United States Patent
Birgenheier et al.

(10) Patent No.: US 7,310,504 B2
(45) Date of Patent: Dec. 18, 2007

(54) IF FREQUENCY RESPONSE CHARACTERIZATION EMPLOYING OVERLAPPING FREQUENCY BANDS

(75) Inventors: Raymond A. Birgenheier, Spokane, WA (US); Richard P. Ryan, Spokane, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 567 days.

(21) Appl. No.: 10/811,337

(22) Filed: Mar. 26, 2004

(65) Prior Publication Data

US 2005/0215217 A1    Sep. 29, 2005

(51) Int. Cl.
*H04B 17/00*  (2006.01)
(52) U.S. Cl. ................. 455/226.1; 455/67.11; 455/67.14; 324/76.19; 324/628
(58) Field of Classification Search ........... 455/323, 455/226.1, 67.11, 227, 550.1, 575.1, 561, 455/425, 426, 456.5, 456.6, 423, 63.1, 506, 455/507, 67.14, 67.13, 114.2, 113, 115.2, 455/115.4, 278.1, 295, 296, 302, 304, 305, 455/226.4, 115.1, 285; 375/102, 322, 324, 375/77, 94, 316, 331, 235, 229, 216, 340, 375/346, 350; 324/115, 667, 669, 681, 76.19–76.26
See application file for complete search history.

(56) References Cited

U.S. PATENT DOCUMENTS

| | | | | |
|---|---|---|---|---|
| 5,099,200 A * | 3/1992 | Tarantino et al. | ............ | 324/619 |
| 5,117,377 A * | 5/1992 | Finman | ............ | 703/2 |
| 5,826,180 A * | 10/1998 | Golan | ............ | 455/302 |
| 5,978,659 A * | 11/1999 | Kim | ............ | 455/67.11 |
| 6,337,888 B1 * | 1/2002 | Huang et al. | ............ | 375/322 |
| 6,526,365 B1 * | 2/2003 | Marino et al. | ............ | 702/111 |
| 6,636,722 B1 * | 10/2003 | Dalebroux et al. | ............ | 455/67.11 |
| 6,785,529 B2 * | 8/2004 | Ciccarelli et al. | ............ | 455/324 |
| 6,842,608 B2 * | 1/2005 | Cutler | ............ | 455/67.14 |
| 6,920,321 B1 * | 7/2005 | Miyagi | ............ | 455/423 |
| 7,088,765 B1 * | 8/2006 | Green et al. | ............ | 375/142 |
| 2003/0050014 A1 * | 3/2003 | Cain et al. | ............ | 455/67.1 |
| 2003/0187601 A1 * | 10/2003 | Dufour et al. | ............ | 702/92 |
| 2004/0041554 A1 * | 3/2004 | Miyauchi | ............ | 324/76.19 |
| 2004/0136438 A1 * | 7/2004 | Fullerton et al. | ............ | 375/130 |
| 2004/0248526 A1 * | 12/2004 | Narita et al. | ............ | 455/114.2 |
| 2005/0070236 A1 * | 3/2005 | Paulus | ............ | 455/135 |
| 2005/0186914 A1 * | 8/2005 | Heaton et al. | ............ | 455/67.11 |

* cited by examiner

*Primary Examiner*—Edward F. Urban
*Assistant Examiner*—Charles Chow

(57) ABSTRACT

A method and system characterizes an IF response of a receiver under test, such that an effect on the characterization by errors associated with uncertainties in knowledge of an RF stimulus signal used to perform the characterization is reduced. The method includes determining an estimate of an actual IF response of the receiver under test from IF responses of the receiver under test measured at overlapping frequency bands and a set of conversion coefficients computed therefrom, such that the estimate reduces the effect of the errors. The system includes a signal generator, an IF processor, a computer program, and a controller that controls the generator and the processor and executes the computer program. When a receiver under test is characterized, the receiver is connected between the signal generator, the IF processor and the controller. The computer program includes instructions that implement characterizing the receiver IF response.

40 Claims, 4 Drawing Sheets

IF FREQUENCY RESPONSE CHARACTERIZATION EMPLOYING OVERLAPPING FREQUENCY BANDS

BACKGROUND

1. Technical Field

The invention relates to radio frequency (RF) receiver systems and measurements performed on same.

2. Description of Related Art

A frequency response of a radio frequency (RF) receiver or receiving system often is measured or characterized by applying an RF input signal R(f) to an input of the receiver and measuring an intermediate frequency (IF) output signal I(f) produced by the receiver at an IF output. The frequency response or transfer function is a complex ratio of output signal I(f) over the input signal R(f) as a function of frequency f. Moreover, since in most such RF receiver systems an IF portion of the receiver tends to dominate the overall transfer function of the system, the measured frequency response is essentially an IF frequency response of the receiver and may be, in general, represented by a 'filter-like' transfer function $H_r(f)$. Thus, a frequency response measurement of the receiver system is often essentially an IF frequency response measurement or IF characterization of the receiver system.

Typical approaches to receiver system measurement generally assume that the input signal R(f) is known exactly or at least with sufficiently high precision to support a particular error budget for the measurement. Unfortunately however, in many practical situations complete or precise knowledge of the input signal R(f) may be lacking. This is especially true when attempting to perform highly precise characterizations of downconverting receivers such as a modem measurement receiver or a vector spectrum analyzer. Errors or uncertainties in knowledge of the input signal R(f) contribute to an overall measurement error in the receiver transfer function.

Accordingly, it would be advantageous to have an IF frequency response characterization for an RF receiver that compensates for or effectively reduces an effect that an uncertainty in knowledge of the input signal R(f) has on the characterization. Such an IF frequency response characterization would solve a long-standing need in the area of RF receiver measurement.

BRIEF SUMMARY

In some embodiments of the invention, a method of characterizing an intermediate frequency (IF) response of a receiver using measurements performed on overlapping frequency bands is provided. The method employs the overlapping frequency band measurements to reduce or minimize an effect of uncertainties in knowledge of an RF stimulus signal. The method comprises measuring an IF response of the receiver, computing a set of conversion coefficients from the measured IF response, and determining an estimate of an actual IF frequency response using the measured IF response and the conversion coefficients. The method may optionally further comprise removing a radio frequency (RF) tilt introduced by an RF portion of the receiver.

In other embodiments of the invention, an IF measurement system that employs measurements of overlapping frequency bands is provided. The IF measurement system comprises a signal generator that applies an RF stimulus signal to the receiver under test, an IF processor that receives and digitizes an IF response of the receiver under test, and a controller that controls the signal generator, receiver under test, and IF processor as well as processing the digitized IF response. The IF measurement system further comprises a computer program executed by the controller that determines an estimate of an actual IF response of the receiver from the overlapping frequency band measurements such that the estimate minimizes an effect of uncertainties in knowledge of an RF stimulus signal.

Certain embodiments of the present invention have other features in addition to and in lieu of the features described hereinabove. These and other features of embodiments of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Various embodiments of present invention facilitate measuring or characterizing an intermediate frequency (IF) transfer function or frequency throughput response (hereinafter 'IF response') of a receiver by reducing errors associated with uncertainties in knowledge (hereinafter 'stimulus uncertainties') of a radio frequency (RF) stimulus signal R(f) used to perform the characterization. In some embodiments, such errors associated with stimulus uncertainties may be minimized. Stimulus uncertainties may be a result of an uncertainty associated with knowledge of a baseband transmitter filter frequency response $H_g(f)$ and/or uncertainty in knowledge of a spectrum of a baseband stimulus signal S(f). Additionally, an effect of uncertainty in knowledge of an RF portion of one or both of the transmitter and the receiver similarly may contribute to the uncertainties in the RF stimulus signal R(f) knowledge (i.e., 'stimulus uncertainties').

Figure 1:
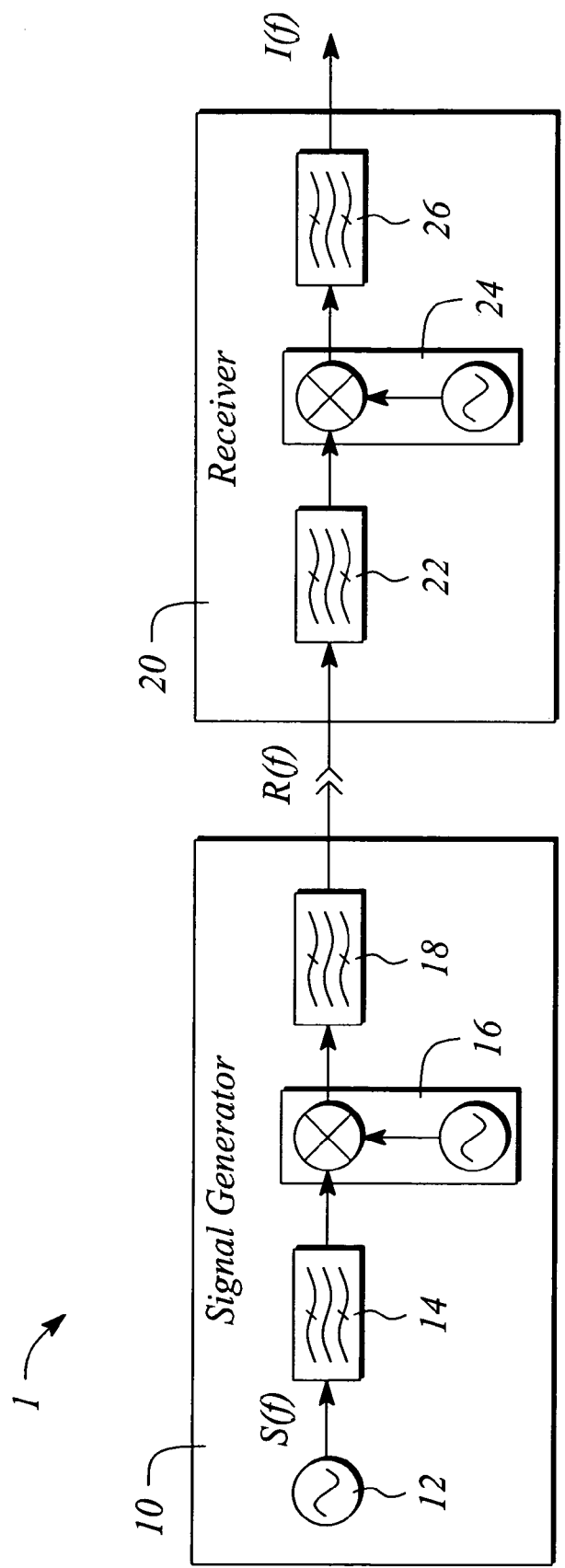
FIG. 1 illustrates a simplified block diagram of an exemplary transmitter and receiver portion of an IF measurement system according to an embodiment of the present invention.

FIG. 1 illustrates a block diagram of an exemplary transmitter and receiver portion of an IF measurement system 1 according to an embodiment of the present invention. The transmitter and receiver portion of the IF measurement system 1 comprises an exemplary radio frequency (RF) signal source or transmitter 10 and an exemplary receiver 20. The IF measurement system 1 produces measurements of an IF frequency transfer or response characteristic I(f) of the exemplary receiver 20. The measurements are produced using an RF stimulus signal R(f) created by the transmitter 10.

As illustrated in FIG. 1, the exemplary transmitter 10 comprises a signal generator or baseband stimulus source 12, a transmitter baseband filter 14, an upconverter 16, and a transmitter RF filter 18. The baseband stimulus 12 produces a baseband stimulus signal S(f). The stimulus signal S(f) passes through and is filtered by the baseband filter 14 having a transfer function $H_g(f)$. A filtered baseband signal G(f) is produced at an output of the baseband filter 14. The filtered baseband signal G(f) is upconverted to an RF signal having an RF frequency by the upconverter 16. The upconverter 16 includes a tunable local oscillator (LO), a tuning of which determines the carrier frequency of the RF signal. The RF signal then passes through and is filtered by the transmitter RF filter 18 to produce an RF stimulus signal $R_{tx}(f)$ at an output of the transmitter 10. The RF stimulus signal $R_{tx}(f)$ is then applied to an input of the receiver 20 to perform an IF frequency response characterization of the exemplary receiver 20. The RF stimulus signal $R_{tx}(f)$ is illustrated in FIG. 1 as R(f), for the reason set forth below.

The receiver 20 comprises a receiver RF filter 22, a receiver downconverter 24, and an IF stage represented herein by an IF filter 26. The RF stimulus signal $R_{tx}(f)$ is filtered by the RF filter 22 to produce a filtered RF signal R(f). The filtered RF signal R(f) is then applied to and downcoverted to an IF frequency by the downconverter 24. An IF output of the downconverter 24 is applied to and filtered by the IF filter 26 to produce an IF signal I(f) at an output of the receiver 20. The IF signal I(f) is sampled or measured to determine or characterize an IF response of the receiver 20.

As used herein, a variable that is denoted as a function of frequency (e.g., R(f) or $H_g(f)$) is a frequency domain or spectral representation of the variable. The variable may represent one or both of a magnitude and a phase or equivalently, a real part and an imaginary part of the variable represented in the frequency domain. Similarly, a variable denoted as a function of time (e.g., s(t)) is understood to be a time domain or impulse representation of the variable.

Also, while technically the RF stimulus signal $R_{tx}(f)$ differs from the filtered RF signal R(f) as a result of the action of the RF filter 22, from the standpoint of IF response characterization, the RF stimulus signal $R_{tx}(f)$ and the filtered RF signal R(f) are similar signals. Therefore, herein no distinction will be made between the RF stimulus signal $R_{tx}(f)$ and the filtered RF signal R(f) (i.e., R(f) will be used) unless the distinction is considered warranted.

The exemplary transmitter and receiver portion of the IF measurement system 1 illustrated in FIG. 1 is provided for discussion purposes only and is not meant to limit the scope of any embodiment of the present invention in any way. The exemplary transmitter and receiver portion of the IF measurement system 1 illustrated in FIG. 1 is merely representative of essentially any transmitter and receiver portion of an IF measurement system. Specifically, other such transmitter and receiver portions may include elements in addition to or that differ from those illustrated in FIG. 1 and still be within the scope of the present invention.

For example, the exemplary upconverting transmitter 10 illustrated in FIG. 1 may be replaced by an RF signal generator 10 that directly generates the RF stimulus signal R(f) rather than generating the base band stimulus signal S(f) and then upconverting the baseband stimulus signal S(f) to produce the RF stimulus signal R(f). In another example, a multi-stage upconverting RF signal generator 10 may be employed. In yet another example, the single stage receiver 20 illustrated in FIG. 1 may be replaced by a multi-stage downconverting receiver 20. In another example, the receiver 20 may have both upconverting and downconverting stages. Notwithstanding such variations in the transmitter and receiver portion of the IF measurement system 1, virtually any transmitter and receiver portion of an IF measurement system may be represented by the major building blocks or elements illustrated in FIG. 1.

Figure 2:
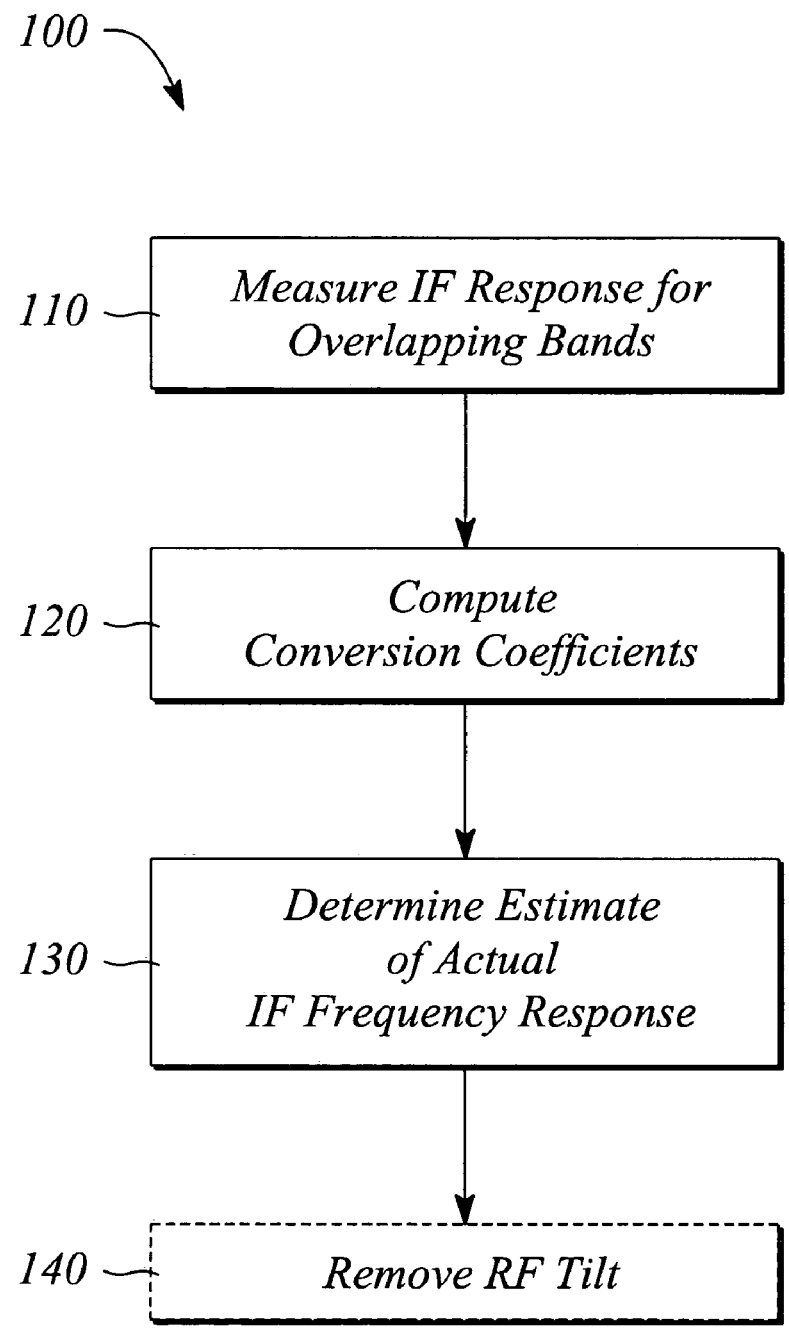
FIG. 2 illustrates a flow chart of a method of characterizing an IF frequency response of a receiver using measurements of overlapping frequency bands according to an embodiment of the present invention.

FIG. 2 illustrates a flow chart of a method 100 of characterizing an IF frequency response of a receiver using measurements of overlapping frequency bands according to an embodiment of the present invention. Method 100 essentially averages measurements of an IF frequency response of the receiver taken for a plurality of overlapping frequency bands. Averaging the measurements reduces an effect of uncertainties in knowledge of a baseband transmitter filter and/or in knowledge of a baseband stimulus signal. In addition, the method 100 may reduce errors associated with uncertainty in knowledge of a transfer function of an RF portion of a transmitter and/or a transfer function of an RF portion of the receiver. Hereinafter, any such 'uncertainty in knowledge of' is referred to as 'stimulus uncertainty' or 'stimulus uncertainties' for simplicity of discussion herein. In some embodiments, such effect or such errors associated with stimulus uncertainty may be minimized.

In some embodiments, the method 100 combines response measurements in a select manner to obtain an improved estimate of the frequency response of an IF portion of the receiver. In some of these embodiments, the method 100 combines response measurements in an essentially optimal manner. The improved estimate provides a characterization of the IF portion that more closely represents a true or accurate transfer characteristic than the direct or raw receiver measurements obtained without employing the method 100. Among other things, such an improved or more accurate IF response characterization may be employed to construct a compensating filter for the receiver, for example.

The method 100 of characterizing an IF frequency response of a receiver comprises measuring 110 an IF response of the receiver for overlapping RF frequency bands. As used herein, an RF frequency band is a contiguous range or set of RF frequencies spanning from a frequency $f_l$ at a lower band edge of the frequency band to a frequency $f_u$ at an upper band edge of the frequency band. The RF frequency band also has a center frequency f midway between the lower band edge frequency $f_l$ and the upper band edge frequency $f_u$. A difference between the upper band edge frequency $f_u$ and the lower band edge frequency $f_l$ defines a bandwidth BW of the frequency band.

RF signals, or portions thereof, within the RF frequency band are converted to IF signals by the receiver. Thus for example, a frequency component of an RF signal centered at an RF center frequency f is converted to a frequency component of an IF signal centered at an IF center frequency $f_{c,IF}$. Simultaneously, frequency components of the RF signal on one or both sides of the RF center frequency $f_c$ within the bandwidth BW of the receiver are similarly converted to frequency components on one or both sides of the IF center frequency $f_{c,IF}$. Selecting a given tuning point of the receiver (i.e., tuning the receiver) determines a particular RF frequency band B with a particular center frequency $f_c$.

In most cases, a bandwidth BW of the receiver is set or established by an IF filter of the IF stage having an IF bandwidth $BW_{IF}$. Occasionally however, an RF filter or RF stage having an RF bandwidth $BW_{RF}$ may set the receiver bandwidth BW. For purposes of discussion herein and not by way of limitation, the bandwidth $BW_{RF}$ of the RF frequency band B will be assumed to be equal to IF bandwidth $BW_{IF}$.

Thus, both the RF bandwidth $BW_{RF}$ and IF bandwidth $BW_{IF}$ will be referred to herein as the receiver bandwidth BW without ambiguity or loss of generality.

Furthermore, for the purposes of discussion hereinbelow, it is assumed that there is a one-to-one correspondence between a particular RF signal frequency component within a given or selected RF band B of the receiver and a particular IF signal frequency component within the IF bandwidth $BW_{IF}$ of the output signal I(f) of the receiver. The specific one-to-one correspondence is determined by a particular frequency conversion plan of the receiver. For example, in one such conversion plan, the RF signal frequency components at the lower RF band edge $f_l$ are converted to a lower band edge $f_{l,IF}$ of the IF band while simultaneously, the RF signal frequency components at the upper RF band edge $f_u$ are converted to an upper band edge $f_{u,IF}$ of the IF band.

A pair of RF frequency bands 'overlaps' if the receiver bandwidth BW is greater than a difference between the center frequencies $f_c$ of the RF frequency bands. For example, if the receiver bandwidth BW is 40 MHz, a first frequency band $B_1$ having an RF center frequency $f_{c,1}$ equal to 1,000 MHz overlaps a second frequency band $B_2$ having an RF center frequency $f_{c,2}$ equal to 1,020 MHz. In particular in this example, bands $B_1$ and $B_2$ overlap by exactly one-half of the receiver bandwidth BW (i.e., overlap=BW/2).

In some embodiments, measuring 110 an IF response of the receiver comprises applying an RF stimulus signal R(f) to an input of the receiver, and measuring a response or an IF output signal I(f) of the receiver. Measuring 110 may further comprise computing a transfer function or characteristic for the measurement. The transfer function is a ratio of the measured IF response I(f) over the applied stimulus R(f). In general, the transfer function of the receiver is a complex quantity having a magnitude and phase or equivalently, having a real part and an imaginary part. Thus, the ratio taken for determining the measured 110 transfer characteristic is a complex ratio.

The RF stimulus signal R(f) is largely a function of a given IF measurement system. In some embodiments, the RF stimulus signal R(f) may be a broadband signal. In some embodiments, the RF stimulus signal R(f) is a periodic broadband signal having a period that is a reciprocal of a measurement frequency resolution Δf. The measurement frequency resolution Δf in turn, may be chosen such that a step size or tuning resolution of the receiver is an integer multiple of the measurement frequency resolution Δf. The step size or tuning resolution of the receiver is a difference between center frequencies of adjacent bands B or equivalently, a tuning resolution of a local oscillator of a down-conversion stage of the receiver. Thus for example, for a receiver having a tuning resolution that is any one of 1.25 MHz, 2.5 MHz or 5 MHz, the measurement frequency resolution Δf may be chosen to be 50 kHz (e.g., 50 kHz× 100=5 MHz).

In various embodiments, the broadband signal used as the RF stimulus signal R(f) may include, but is not limited to, a summation of a plurality of sinewaves, a periodic chirped waveform, and a combination thereof. For example, an RF stimulus signal R(f) may comprise a plurality of sinewaves summed together wherein the sinewaves in the plurality are separated in frequency from one another by the measurement frequency resolution Δf. In addition, the sinewaves in the plurality may be each offset in phase from one another in the summation. In some embodiments, the phase offset of the sinewaves is selected to minimize a crest factor of the stimulus signal R(f). Such a phase offset or phase factor for each sinewave in the plurality may be determined by a random search subject to a condition that the crest factor of the summation is minimized, for example. It has been demonstrated that a random search of phase factors may produce a plurality of sinewaves that, when summed, produce a stimulus signal R(f) having a crest factor of approximately 7.85 or less. A crest factor of less than or about 7.85 is acceptably low for many applications of method 100. However, stimulus signals R(f) having higher crest factors may be acceptable in certain situations. Acceptability of a particular crest factor is generally determined on a case-by-case basis for a given measurement system. For example, in some instances acceptability of the crest factor is based on a dynamic range within which the given measurement system (e.g., as illustrated in FIG. 1) is sufficiently linear such that introduced error are negligible with respect to an operational characteristic of the system.

In another example, a constant envelope signal may be employed as the RF stimulus signal R(f). An example of such a constant envelope signal with a low crest factor is a periodic chirped waveform signal. For example, a linear chirped waveform signal may be described in terms of a discrete time variable m as $$s(m) = \exp(j\theta_m) \quad m = 1, 2, \ldots, M \text{ where} \quad (1)$$

$$\theta_m = 2\pi A(m - C)\frac{m}{f_s} + \theta_0 \quad (2)$$

and where $f_s$ is a sample frequency and the constants A, C, and $\theta_0$ are selected to satisfy $\theta_1 = \theta_M$ $(\theta_2 - \theta_1) = -2\pi BW_s$ $\theta_0 = 0$ (3)

in which $BW_s$ is a bandwidth of the chirped waveform signal (e.g., $BW_s \geq$ receiver bandwidth BW).

The crest factor of the real and imaginary components of such a linear chirped waveform signal is that of a pure sinewave (i.e., 3 dB). As such, the linear chirped waveform signal typically requires significantly less dynamic range of a digital-to-analog converter (DAC) used to generate the signal compared to a sum of sinewaves with randomly selected phase factors.

In some embodiments, the bandwidth $BW_s$ of the linear chirped waveform stimulus signal is chosen to be somewhat larger than the receiver bandwidth BW to reduce a deviation that occurs near an upper and lower band edge of the linear chirped waveform stimulus signal. For example, a bandwidth $BW_s$ equal to 6.15 MHz (e.g., 23 percent larger than BW thereby resulting in less than ±1 dB variation within BW) may be used to generate such a stimulus signal for use with a receiver bandwidth BW equal to 5 MHz. Employing the linear chirped waveform stimulus signal with a bandwidth $BW_s$ that is larger than the receiver bandwidth BW may result in a magnitude spectrum of the stimulus signal that varies by less than approximately ±1 dB within the receiver bandwidth BW.

A maximum value for the discrete time variable m (i.e., M) depends on a particular situation. For example, consider a situation in which the frequency resolution Δf is 50 kHz and a sampling frequency is 56 MHz. A number of fre quency samples is then 1,120 and a number of spectral lines produced by the stimulus signal is given approximately by $$\text{Number of Spectral Lines} \approx \frac{BW_s}{\Delta f} + 1 \Rightarrow \text{For } BW_s = 5 \text{ MHz,} \quad (4)$$

$$\text{Number of Spectral Lines} = 101$$

The particular number of frequency samples in the example is a ratio of the sampling frequency and the frequency resolution that equals 1,120. Note that the number of frequency samples 1,120 has factors of 32, 7, and 5. Among other things, this facilitates use of an efficient prime-factor Fast Fourier Transform (FFT) to compute a frequency spectrum thereby minimizing a computational load penalty. For example, having the number of frequency samples equal to 1,120 with factors 32, 7 and 5 allow use of a 4,480-point FFT since such an FFT has factors of 128, 7 and 5. In addition, a period of the stimulus signal equal to a reciprocal of the frequency resolution $\Delta f$ is 50 kHz (i.e., 1/50 kHz=20 μsec) may be determined along with choosing a sampling period of the stimulus signal of 1/84 μsec. Under such conditions, a maximum value M equal to 1,680 is established (i.e., 20 μsec×84 μsec$^{-1}$=1,680).

Moreover, in certain embodiments a spectral offset of the linear chirped waveform stimulus signal is employed. For example, the spectral offset may be used to avoid or at least reduce measurement errors associated with local oscillator (LO) feedthrough in the signal generator. The spectral offset also may help to avoid or reduce measurement errors associated with images generated by various elements or stages in the signal generator. Stages in the signal generator include, but are not limited to, an IQ modulator. For example, when a linear chirped waveform signal having spectral lines separated by a frequency resolution $\Delta f$ of about 50 kHz is employed, a spectral offset of about 12.5 kHz (i.e., $\Delta f/4$) may be used. In such an embodiment, the spectral lines will be located at frequencies given by $$f_m = f_0 + \left(\frac{1}{4} + m\right)\Delta f \quad m = 0, \pm 1, \pm 2, \ldots \quad (5)$$

where $f_m$ is a frequency of an mth spectral line and $f_0$ is carrier frequency (i.e., generally located at the center frequency $f_c$). An FFT used in processing the measurements obtained from the receiver may have 'frequency bins' located at the frequencies of the spectral lines, for example. As such, the FFT will not be affected by the carrier feedthrough since carrier feedthrough occurs at the carrier frequency $f_0$. Similarly, the FFT processing will not be affected or hindered by the images since the images occur at frequencies given by $$f_m = f_0 - \left(\frac{1}{4} + m\right)\Delta f \quad m = 0, \pm 1, \pm 2, \ldots \quad (6)$$

Thus, neither the carrier feedthrough nor the images will contribute to measurement errors when using FFT-based processing.

Figure 3:
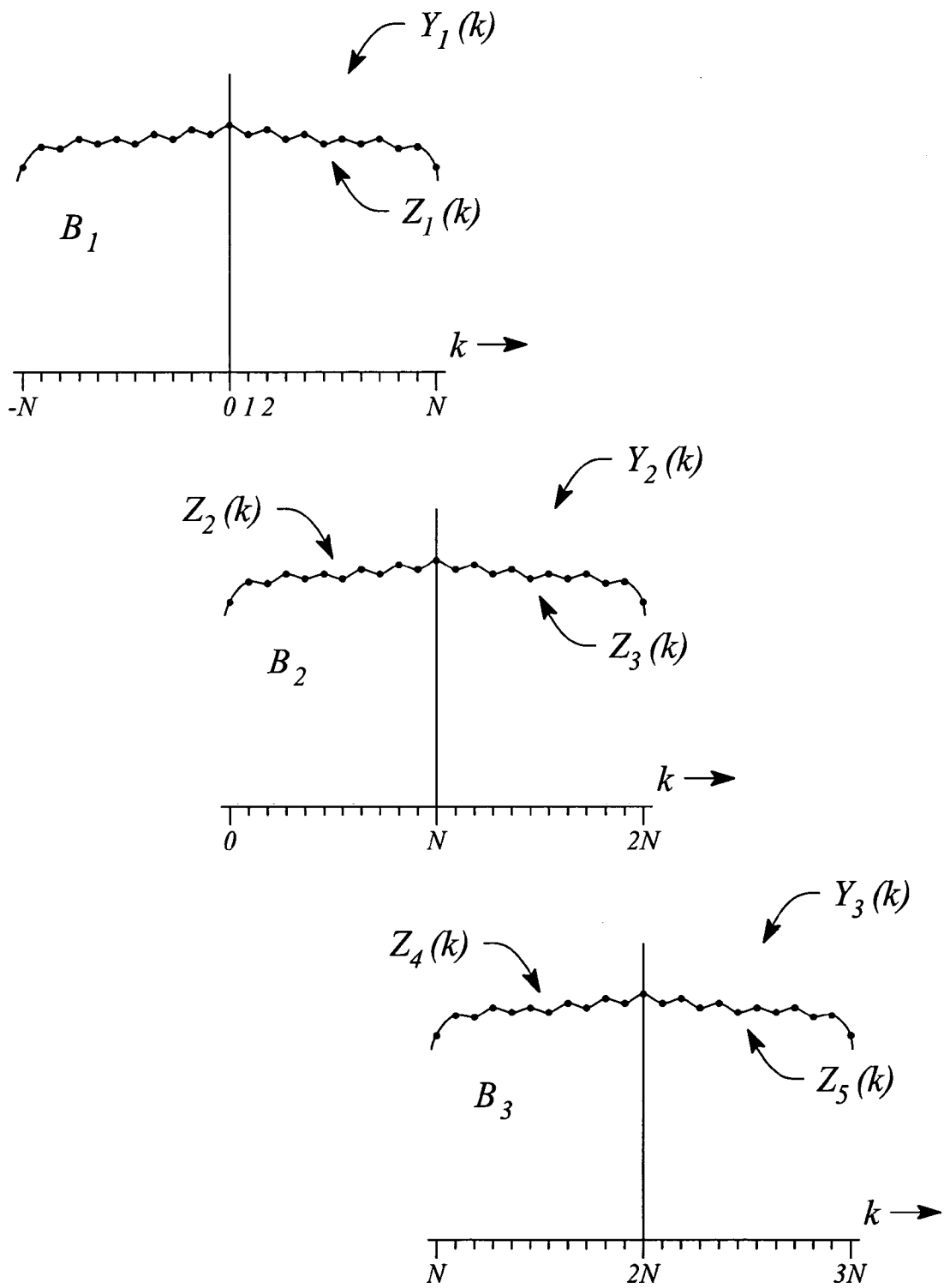
FIG. 3 illustrates graphical plots of an example set of measurements plotted as a function of RF frequency for a plurality of overlapping bands according to an embodiment of the present invention.

In some embodiments, the IF response is measured 110 for bands that overlap by one half of a bandwidth BW. In other words, the IF response is measured 110 for a first band $B_1$ having center frequency $f_{c,1}$. The receiver is then tuned to a second band $B_2$ having center frequency $f_{c,2}$ such that $f_{c,2}$ equals $f_{c,1}$ plus BW/2. The IF response is measured 110 for the second band $B_2$. The process of tuning and measuring 110 is repeated for each band $B_i$. FIG. 3 illustrates a graphical representation of an example of a set of measurements plotted as a function of RF frequency for a plurality of overlapping bands according to an embodiment of the invention. The exemplary measurements represent a magnitude of the measured 110 IF frequency response of a receiver under test for several overlapping bands (e.g., $B_i$ where i=1, 2, . . . ). The measurements are indexed by an index k, where individual values of the index k represent discrete frequencies.

Referring again to FIG. 2, the method 100 of characterizing an IF frequency response further comprises computing 120 a set of conversion coefficients or weights $a_i$. The conversion coefficients $a_i$ define a relationship between an actual frequency response X(k) and the measured frequency responses $Y_i(k)$. The actual frequency response X(k) is the IF response without errors. The conversion coefficient $a_i$ essentially represents a change in an IF conversion loss or response magnitude and an IF phase shift or response phase that occurs in the IF response as a function of tuning or stepping the receiver from one band $B_i$ to a next, overlapping band $B_{i+1}$. A relationship between the measured frequency responses $Y_i(k)$ and the actual frequency response X(k) is given by $$Y_i(k) = a_i \cdot X(k) + N_i(k) \quad (7)$$

where $N_i(k)$ is an introduced error.

In some embodiments, the computed 120 set of conversion coefficients $a_i$ represent an estimate of 'true' or exact conversion coefficients. In such embodiments, the conversion coefficients $a_i$, more properly denoted $\hat{a}_i$, may be computed or estimated 120 such that the conversion coefficients $\hat{a}_i$ reduce a sum-square difference between the measured 110 overlapping frequency responses for the bands. In some embodiments the estimated 120 conversion coefficients $\hat{a}_i$ minimize the sum-square difference. For simplicity herein and not by way of limitation, distinction between the estimated conversion coefficients, $\hat{a}_i$ and the 'true' conversion coefficients is made only where such a distinction is necessary for a proper understanding. Otherwise the estimated and true conversion coefficients are considered interchangeable and the same notation, namely '$a_i$', is used to denote both herein.

To continue, consider an exemplary set of IF frequency response measurements $Y_i(k)$ illustrated in FIG. 3 where an index variable i corresponds to an ith band of the measured 110 IF response. A plurality of related subgraphs are illustrated in FIG. 3, one subgraph for each of three exemplary bands $B_i$. The index k indexes discrete frequency response measurement points within each of the bands $B_i$ as indicated in FIG. 3 where the index k is plotted along respective x-axes while an amplitude of the response measurement $Y_i(k)$ is plotted with respect to respective y-axes of the subgraphs. Also in FIG. 3, the center frequency $f_{c,i}$ of each of the bands $B_i$ is respresented by a center point on respective x-axes of each of the subgraphs.

As illustrated in FIG. 3, there are 2N+1 discrete frequency points measured in each band $B_i$, where N is an integer (e.g., N=5). Thus, k ranges from −N to N and k equals 0 at the center frequency $f_{c,1}$ for band $B_1$. For band $B_2$, k ranges from 0 to 2N and k equals N at the center frequency $f_{c,2}$. In band $B_3$, k ranges from N to 3N with k equaling 2N at the center frequency $f_{c,3}$, and so on.

A set of half-band measurements $Z_i(k)$ may be defined in terms of the exemplary set of measurements $Y_i(k)$ for overlapped band portions as $Z_1(k)=Y_1(k)$ $k=0,1,\ldots,(N-1)$ $Z_2(k)=Y_2(k)$ $k=0,1,\ldots,(N-1)$ and for $i=2,3,\ldots$ $Z_{2i-1}(k)=Y_i(k)$ $k=(i-1)N,(i-1)N+1,\ldots,iN-1$ $Z_{2i}(k)=Y_{i+1}(k)$ $k=(i-1)N,(i-1)N+1,\ldots,iN-1$ (8)

Having defined the half-band measurements $Z_i(k)$ according to equation (8), the conversion coefficients $a_i$ are defined in terms of another coefficient $b_i$ with a first conversion coefficient $a_1$ arbitrarily set to 1, as given by equation (9), namely $a_{i+1} = b_i \cdot a_i;$ $i=1, 2,$ and $a_1 = 1$ (9)

In some embodiments, the other coefficient $b_i$ is estimated or determined in terms of the half-band measurements $Z_i(k)$ as $$b_i = \frac{\sum_{k=0}^{N-1} Z_{2i}[k+N(i-1)] \cdot Z_{2i-1}^*[k+N(i-1)]}{\sum_{k=0}^{N-1} |Z_{2i-1}[k+N(i-1)]|^2}$$ (10a)

$i = 1, 2, 3, \ldots$ where $Z_{2i-1}^*$ is the complex conjugate of $Z_{2i-1}$.

In other embodiments, the other coefficient $b_i$ is estimated or determined by averaging the half-band measurements $Z_i(k)$ in the overlapping half bands. For example, the other coefficient $b_i$ may be given in terms of the half-band measurements $Z_i(k)$ as simply $$b_i = \frac{1}{N} \sum_{k=0}^{N-1} \frac{Z_{2i}[k+N(i-1)]}{Z_{2i-1}[k+N(i-1)]} \quad i = 1, 2, 3, \ldots$$ (10b)

Referring again to FIG. 2, the method 100 of characterizing an IF frequency response further comprises determining 130 an estimate of the actual frequency response $\hat{X}(k)$. The estimated frequency response $\hat{X}(k)$ is determined as a weighted average of the measured 110 IF response wherein estimates of the conversion coefficients $a_i$ are employed as weights. In some embodiments, estimates of the set of conversion coefficients $a_i$ are used in conjunction with the half-band measurements $Z_i(k)$ to determine the estimated frequency response $\hat{X}(k)$ as given by $$\hat{X}[k+(i-1)N] = \frac{1}{2}\left\{\frac{1}{a_{2i}}Z_{2i}[k+(i-1)N] + \frac{1}{a_{2i-1}}Z_{2i-1}[k+(i-1)N]\right\};$$ (11)

for $\begin{cases} k = 0, 1, 2, \ldots, N-1 \\ i = 1, 2, 3, \ldots \end{cases}$

Thus, the conversion coefficients $a_i$ are computed 120 from the other coefficient $b_i$ using equation (9) wherein the other coefficient $b_i$ is found or estimated by employing either equation (10a) or equation (10b) along with the measured 110 IF response converted using equation (8) to half-band measurements $Z_i(k)$. An average, such as that given by equation (11), is then used to determine 130 the estimated frequency response $\hat{X}(k)$.

In some situations, a delay misalignment among the frequency samples in the IF response measurements may interfere with the method 100. In particular, if timing errors occur between one or more of the IF response measurements, a delay misalignment may be present. Such delay misalignment often manifests itself as a random added delay in the overlapping measurements.

Therefore, in some embodiments, the method 100 may be modified to reduce the effects of such a delay misalignment. As such, some embodiments of the method 100 further comprise removing a delay misalignment from either the set of IF frequency response measurements $Y_i(k)$ or the half-band IF frequency response measurements $Z_i(k)$ at overlapping frequency bands prior to computing 120 the conversion coefficients $a_i$.

In such embodiments, removing the delay misalignment comprises finding a phase progression in a ratio of measurements from overlapping bands. Removing the delay misalignment further comprises multiplying the measurement ratios by a complex conjugate of the phase progression to remove the phase progression. Following removal of the phase progression, the ratios may be employed to compute the other variable $b_i$ and then the conversion coefficient $a_i$ as detailed hereinabove. In some of these embodiments, a linear regression is used to find the phase progression.

For example, the phase progression P may be found by computing a set of ratios indexed on k of half-band measurements $Z_{2i}(k)/Z_{2i-1}(k)$ for a pair of overlapping bands. More than one set of ratios for more than one overlapping band may be computed. Phase values $p_k$ of each ratio of the set of ratios may be determined by taking the angle (i.e., angle (•)) of each ratio in the set.

The phase values $p_k$ may be normalized by removing a typical phase amount from the phase values $p_k$. For example, to normalize the phase values $p_k$, a middle phase value $p_{mid}$ may be subtracted from each phase value $p_k$. The middle phase value $p_{mid}$ may be a phase value for a ratio approximately halfway between a lower end and an upper end of a half-band, for example.

A linear regression is then employed to find the phase progression P across the overlapping band. Essentially, the linear regression determines a best-fit straight line through the normalized phase values $p_k$. The best-fit straight line is a phase slope or phase progression P that 'best fits' the normalized phase values $p_k$. The notion of 'best fit' herein is used in a conventional sense to mean that a deviation or difference between data and a line or curve representing the data is minimized according some metric. An example of a linear regression that may be employed is given by $$P = \frac{N\sum_k k \cdot p_k - \left(\sum_k k\right)\sum_k p_k}{N\sum_k k^2 - \left(\sum_k k\right)^2}$$ (12)

Once the phase progression P is found by using, for example, equation (12), the phase progression P may be removed from the measurements prior to computing 120 the conversion coefficients $a_i$. For example, the phase progression P may be subtracted from the phase of each of the ratios $Z_{2i}(k)/Z_{2i-1}(k)$ prior to computing the other coefficient $b_i$ using equation (10b). Subtracting the phase progression P essentially multiplies the ratios $Z_{2i}(k)/Z_{2i-1}(k)$ by a complex conjugate of the phase progression P.

In some embodiments, the method 100 of characterizing an IF frequency response optionally further comprises removing 140 an RF tilt. An RF tilt may be introduced by a tilt or slope in a magnitude response of an RF filter in the measurement system, for example. The RF tilt produces a corresponding error in the magnitude of the estimated IF frequency response.

In some embodiments, removing 140 the RF tilt comprises measuring 110 an IF response of the receiver, computing 120 a set of conversion coefficients, and determining 130 an estimate of the estimated IF frequency response $\hat{X}(k)$ for each of an IF response $X(f)$ and an image of the IF response $X_{image}(f)$. In other words, measuring 110, computing 120, and determining 130 are first performed with a first receiver LO setting to produce the IF response $X(f)$. The receiver LO is then adjusted such that an image IF response $X_{image}(f)$ is generated. Then measuring 110, computing 120, and determining 130 are repeated for the image IF response $X_{image}(f)$.

For example, the first receiver LO setting may be such that the LO is at a first frequency $f_{LO,1}$ that is below an RF center frequency $f_c$ of the RF band B. Such an LO setting produces an IF response $X(f)$ having a center frequency $f_{c,IF}$ (e.g., $f_{c,IF}=f_c-f_{LO,1}$ for $f_{LO,1}<f_c$). An IF response $X(f)$ produced by an LO setting with the first frequency $f_{LO,1}$ less than the RF center frequency $f_c$ is sometimes referred to as a 'lower sideband' IF response. The image IF response $X_{image}(f)$ for this example is then generated by setting the LO to a second frequency $f_{LO,2}$ that is correspondingly above the RF center frequency $f_c$ of the RF band B (e.g., $f_{c,IF}=f_{LO,2}-f_c$ for $f_{LO,2}>f_c$). Such an image IF response $X_{image}(f)$ may be referred to as an 'upper sideband' IF response.

Thus, for removing 140 an RF tilt, measuring 110, computing 120, and determining 130 are repeated for each of the upper and lower sideband IF responses $X(k)$, $X_{image}(k)$, to produce a pair of estimated IF responses $\hat{X}(k)$, $\hat{X}_{image}(k)$. The estimated IF response $\hat{X}(k)$ and the estimated image IF response $\hat{X}_{image}(k)$ have RF tilts with opposite signs or slopes.

Removing 140 the RF tilt further comprises combining the estimated IF response $\hat{X}(k)$ and the estimated image IF response $\hat{X}_{image}(k)$. In some embodiments, combining comprises computing a square-root of a product of the estimated IF response $\hat{X}(k)$ and the estimated image IF response $\hat{X}_{image}(k)$. The RF tilt is essentially cancelled or eliminated from the combined estimated IF response as a result of the opposite slopes of the estimated IF response $\hat{X}(k)$ and the estimated image IF response $\hat{X}_{image}(k)$.

Figure 4:
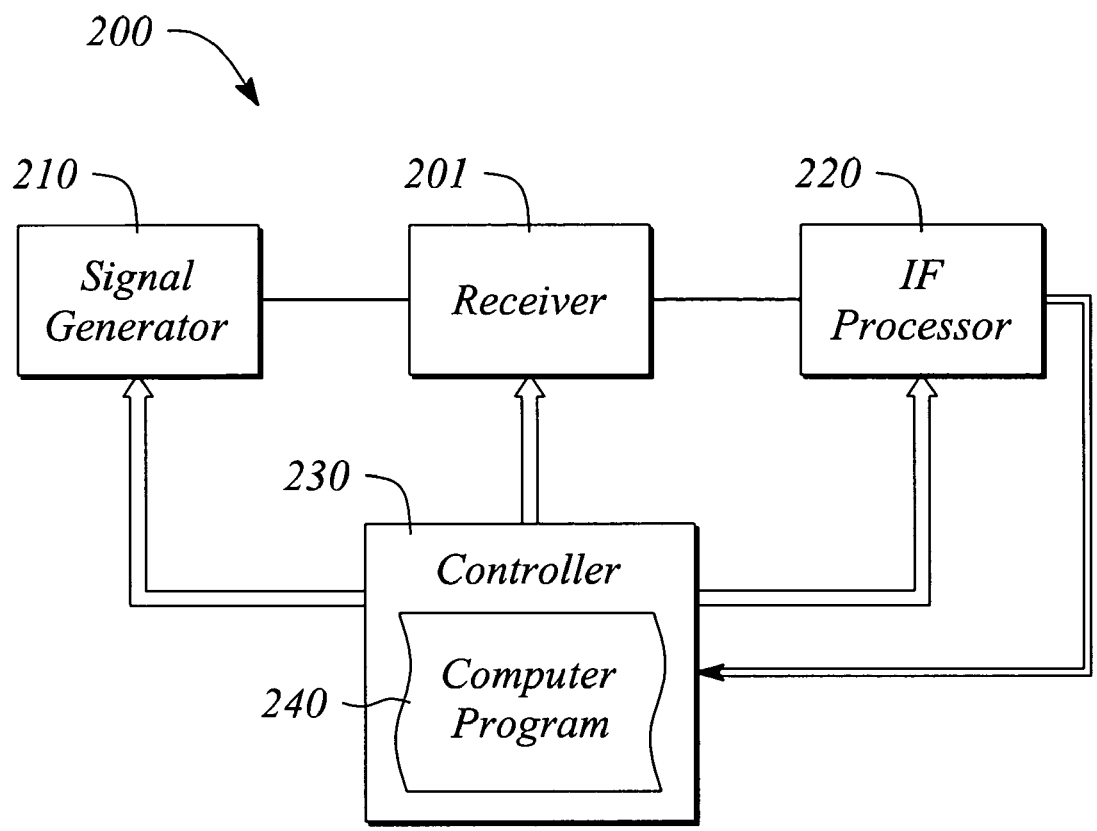
FIG. 4 illustrates a block diagram of an IF measurement system according to an embodiment of the present invention.

FIG. 4 illustrates an IF measurement system 200 according to an embodiment of the present invention. The IF measurement system 200 characterizes an IF response of a receiver 201 under test that is connected to the system 200. The IF measurement system 200 characterizes the IF response such that an effect on the characterization of errors associated with uncertainties in knowledge of an RF stimulus signal R(f) (i.e., 'stimulus uncertainty') used to perform the characterization is reduced. In some embodiments, the system 200 characterizes the IF response such that the effect of the stimulus uncertainty is minimized. In some embodiments, the system 200 essentially implements the method 100 of characterizing an IF frequency response of a receiver described hereinabove.

The IF measurement system 200 comprises a signal generator 210. The signal generator 210 generates an RF stimulus signal R(f) that is applied to an input of the receiver 201 under test. The generated RF stimulus signal R(f) is described hereinabove.

In some embodiments, the signal generator 210 comprises a baseband stimulus source, a transmitter baseband filter, an upconverter, and a transmitter RF filter. For example, the signal generator 210 may be essentially the upconverting transmitter 10 illustrated in FIG. 1. The baseband stimulus source produces a baseband stimulus signal S(f). The stimulus signal S(f) passes through and is filtered by the baseband filter having a transfer function $H_g(f)$. A filtered baseband signal G(f) is produced at an output of the baseband filter. The filtered baseband signal G(f) is upconverted to an RF signal having an RF frequency by the upconverter. The upconverter includes a tunable local oscillator (LO), a tuning of which determines the carrier frequency of the RF signal. The RF signal is then passes through and is filtered by the transmitter RF filter to produce the RF stimulus signal R(f). In other embodiments, an RF stimulus source directly generates (i.e., without frequency converting a baseband signal) the RF stimulus signal R(f). Any of a variety of signal generators known in the art may be employed as the signal generator 210.

The IF measurement system 200 further comprises an IF processor 220. The IF processor 220 receives an IF output signal I(f) produced by the receiver 201 under test. The IF processor 220 comprises an analog-to-digital converter (ADC) to convert the IF output signal I(f) into a digitized IF response. In some embodiments, the IF processor 220 may further comprise analog and/or digital filtering that may be applied to one or both of the IF output signal I(f) prior to digitizing and the digitized IF response.

The IF measurement system 200 further comprises a controller 230. In some embodiments, the controller 230 is a general-purpose computer such as, but not limited to, a personal computer (PC) or a computer workstation. In other embodiments, the controller 230 is a specialized processing engine or processing element of the IF measurement system 200 including, but not limited to an embedded microprocessor and an embedded microcomputer. The controller 230 receives and processes the digitized IF response from the IF processor 220. In addition, the controller 230 may provide timing information and tuning control to the signal generator 210 and the receiver 201 under test as well as may provide control to the IF processor 220.

The IF measurement system 200 further comprises a computer program 240 stored in a computer readable form in a memory of the controller 230. The computer program 240 may further or alternatively be stored in a computer readable media that may be read by the controller 230.

The computer program 240 comprises instructions that implement characterizing an IF response of the receiver 201 under test. Specifically, instructions of the computer program 240 implement characterizing the IF response such that an effect on the characterization by errors associated with uncertainties in knowledge of the RF stimulus signal R(f) (i.e., 'stimulus uncertainty') used to perform the characterization is reduced or in some embodiments, is minimized. In some embodiments, the instructions of the computer program 240 implement determining an estimate of an actual IF response of the receiver from IF responses of the receiver under test measured for overlapping frequency bands, the estimate being determined from a set of overlapping frequency response measurements weighted by the estimated values of the conversion coefficients.

In some embodiments, the instructions of the computer program 240 essentially implement the method 100 of characterizing an IF frequency response described hereinabove. In addition, instructions of the computer program 240 may further implement controlling the tuning and timing of the signal generator 210, tuning of the receiver 201 under test, and controlling the IF processor 220.

In some embodiments, instructions of the computer program 240 implement measuring an IF response of the receiver, computing a set of conversion coefficients from the measured IF response, and determining an estimate of an actual IF frequency response $\hat{X}(k)$ using the measured IF response and estimates of the conversion coefficients. In some embodiments, measuring an IF response may be essentially measuring 110 described hereinabove with respect to the method 100. Similarly, computing the set of conversion coefficients and determining the estimated IF frequency response $\hat{X}(k)$ may be essentially computing 120 and determining 130 of the method 100, respectively. The instructions of the computer program 240 optionally further comprise removing an RF tilt. In some embodiments, removing an RF tilt may be essentially removing 140 described hereinabove with respect to the method 100.

Thus, there has been described various embodiments of the present invention that facilitate characterizing an IF response of a receiver such that effects of stimulus uncertainties with respect to a RF stimulus signal are reduced or may be minimized. It should be understood that the above-described embodiments are merely illustrative of some of the many specific embodiments that represent the principles of the present invention. Those skilled in the art can readily devise numerous other arrangements without departing from the scope of the present invention.

What is claimed is:

1. A method of characterizing an intermediate frequency (IF) response of a receiver comprising:
   determining an estimate of an actual IF response of the receiver from IF responses of the receiver under test measured for overlapping frequency bands and a set of conversion coefficients computed from the IF responses, such that the estimate reduces an effect of an uncertainty in knowledge of a radio frequency (RF) stimulus signal used in the IF response measurements;
   wherein each of said measured IF responses of the receiver under test is a function of frequency, and is derived from measurements made at a plurality of frequencies within each of said overlapping frequency bands.

2. The method of claim 1 further comprising:
   measuring the IF responses of a receiver for a plurality of the overlapping frequency bands;
   computing the set of conversion coefficients from the measured IF responses.

3. The method of claim 2, wherein measuring comprises averaging measurements of the IF frequency response at the overlapping frequency bands of the plurality.

4. The method of claim 1, wherein the uncertainty in knowledge being a result of one or both of an uncertainty in knowledge of a baseband transmitter filter frequency response and an uncertainty in knowledge of a spectrum of a baseband stimulus signal.

5. The method of claim 1, further comprising:
   removing an effect of a radio frequency (RF) tilt, in a magnitude response of an RF portion of the receiver.

6. A method of characterizing an intermediate frequency (IF) response of a receiver comprising:
   determining an estimate of an actual IF response of the receiver from IF responses of the receiver under test measured for overlapping frequency bands and a set of conversion coefficients computed from the IF responses, such that the estimate reduces an effect of an uncertainty in knowledge of a radio frequency (RF) stimulus signal used in the IF response measurements; and
   removing an effect of a radio frequency (RF) tilt in a magnitude response of an RF portion of the receiver, wherein removing the effect of the RF tilt comprises:
   determining the estimate at a first setting of a local oscillator of the receiver to obtain a non-image estimate $\hat{X}(k)$;
   adjusting the local oscillator to a second setting corresponding to an image IF response of the receiver relative to the first setting;
   determining the estimate of the actual IF frequency response at the second setting to obtain an image estimate $\hat{X}_{image}(k)$; and
   combining the non-image estimate $\hat{X}(k)$ and the image estimate $\hat{X}_{image}(k)$ response to cancel the effect of the RF tilt in the combined estimate of the IF response.

7. The method of claim 6, wherein combining comprises computing a square-root of a product of the non-image estimate $\hat{X}(k)$ and the image estimated $\hat{X}_{image}(k)$.

8. The method of claim 1, wherein the IF responses are measured for overlapping frequency bands comprising:
   applying a radio frequency (RE) stimulus signal to an input receiver; and
   measuring an IF output signal response at an output of the receiver for each of a plurality of the overlapping frequency bands.

9. The method of claim 8, wherein measuring an IF output signal response further comprises computing a transfer characteristic for the IF output signal response measurement.

10. The method of claim 8, wherein the RF stimulus signal is a broadband signal comprising one or both of a summation of a plurality of sinewaves and a periodic chirped waveform.

11. A method of characterizing an intermediate frequency (IF) response of a receiver comprising:
   determining an estimate of an actual IF response of the receiver from IF responses of the receiver under test measured for overlapping frequency bands and a set of conversion coefficients computed from the IF responses, such that the estimate reduces an effect of an uncertainty in knowledge of a radio frequency (RF) stimulus used in the IF response measurements; and
   removing an effect of a radio frequency (RF) tilt in a magnitude response of an RF portion of the receiver;
   wherein the IF responses are measured for overlapping frequency bands comprising:
   applying a radio frequency (RF) stimulus signal to an input receiver; and
   measuring an IF output signal response at an output of the receiver for each of a plurality of the overlapping frequency bands;
   wherein the RF stimulus signal is a broadband signal comprising one or both of a summation of a plurality of sinewaves and a periodic chirped waveform; and
   wherein the broadband signal is a periodic broadband signal having a period that is reciprocal of a measurement frequency resolution Δf, a step size or tuning resolution of the receiver being an integer multiple of the frequency resolution Δf, the step size or tuning resolution of the receiver being either a difference between center frequencies of adjacent frequency bands of the plurality or a tuning resolution of a local oscillator of a down conversion stage of the receiver.

12. The method of claim 1, wherein a conversion coefficient of the set defines a relationship between the actual IF frequency response and the IF frequency responses measured for overlapping frequency bands.

13. A method of characterizing an intermediate frequency (IF) response of a receiver comprising:
   determining an estimate of an actual IF response of the receiver from IF responses of the receiver under test measured for overlapping frequency hands and a set of conversion coefficients computed from the IF responses, such that the estimate reduces an effect of an uncertainty in knowledge of a radio frequency (RF) stimulus signal used in the IF response measurements;
   wherein a conversion coefficient of the set defines a relationship between the actual IF frequency response and the IF frequency responses measured for overlapping frequency bands; and
   wherein the relationship between the measured IF frequency responses and the actual IF frequency response is given by $$Y_i(k)=a_i \cdot X(k)+N_i(k) \tag{7}$$

where $a_i$ is an ith conversion coefficient of the set, $Y_i(k)$ is an ith measured IF frequency response, $X(k)$ is the actual IF frequency response, $N_i(k)$ is an introduced error, i is an index variable corresponding to an ith hand of a IF response measurement, and k is an index, wherein individual values of the index k represent discrete frequencies point in the measurements.

14. A method of characterizing an intermediate frequency (IF) response of a receiver comprising:
   determining an estimate of an actual IF response of the receiver from IF responses of the receiver under test measured for overlapping frequency hands and a set of conversion coefficients computed from the IF responses, such that the estimate reduces an effect of an uncertainty in knowledge of a radio frequency (RF) stimulus signal used in the IF response measurements;
   wherein a conversion coefficient of the set defines a relationship between the actual IF frequency response and the IF frequency responses measured for overlapping frequency bands; and
   wherein the set of conversion coefficients is chosen to minimize a sum-square difference between the measured IF responses for a plurality of the overlapping frequency bands.

15. A method of characterizing an intermediate frequency (IF) response of a receiver comprising:
   determining an estimate of an actual IF response of the receiver from IF responses of the receiver under test measured for overlapping frequency hands and a set of conversion coefficients computed from the IF responses, such that the estimate reduces an effect of an uncertainty in knowledge of a radio frequency (RF) stimulus signal used in the IF response measurements;
   wherein a conversion coefficient of the set defines a relationship between the actual IF frequency response and the IF frequency responses measured for overlapping frequency band; and
   wherein the set of conversion coefficients is computed comprising:
   defining a set of half-band IF response measurements in terms of the IF response measurements for overlapped frequency band portions, such that a half of the half-band measurements correspond to IF frequency response measurements in upper half-bands of the overlapped frequency hand portions, while another half of the half-hand measurements correspond to IF frequency response measurements $Y(k)$ in lower half-bands of the overlapped frequency band portions.

16. The method of claim 15, wherein defining a set of half-band measurements in terms of the measure IF responses comprises using an equation $$Z_1(k)=Y_1(k) \; k=0,1,\ldots,(N-1)$$

$$Z_2(k)=Y_2(k) \; k=0,1,\ldots,(N-1)$$

and for i=2,3

$$Z_{2i-1}(k)=Y_i(k) \; k=(i-1)N,(i-1)N+1,\ldots,iN-1$$

$$Z_{2i-1}(k)=Y_{i+1}(k) \; k=(i-1)N,(i-1)N+1,\ldots,iN-1 \tag{8}$$

where $Z_i(k)$ is the set of half-band IF response measurements, $Y_i(k)$ is the measured IF responses, i is an index variable corresponding to an ith band of a measured IF response, k is an index for discrete frequency response measurement points within the ith band, and 2N+1 is an integer representing the discrete frequency response measurement points measured in each ith band.

17. The method of claim 16, wherein the conversion coefficients are defined in terms of another coefficient using an equation $$a_{i+1}=b_1 \cdot a_i; \; i=1,2,\ldots \text{ and } a_1=1 \tag{9}$$

where $a_i$ is a conversion coefficient, and $b_1$ is the other coefficient.

18. The method of claim 17, wherein an estimate of the other coefficient $b_i$ is given in terms of the half-band IF response measurements $Z_j(k)$ as $$b_i = \frac{\sum_{k=0}^{N-1} Z_{2i}[k+N(i-1)] \cdot Z^*_{2i-1}[k+N(i-1)]}{\sum_{k=0}^{N-1} |Z_{2i-1}[k+N(i-1)]|^2} \tag{10a}$$

$$i=1,2,3,\ldots$$

where $Z^*_{2-1}$ is the complex conjugate or $Z_{2i-1}$.

19. The method of claim 17, wherein the other coefficient $b_i$ is determined by averaging the set of half-band IF response measurements $Z_j(k)$ in the overlapping half bands.

20. The method of claim 19, wherein averaging the set of half-hand IF response measurements $Z_i(k)$ comprises using an equation $$\hat{b}_i = \frac{1}{N}\sum_{k=0}^{N-1} \frac{Z_{2i}[k+N(i-1)]}{Z_{2i-1}[k+N(i-1)]} \; i=1,2,3,\ldots \tag{10b}$$

21. The method of claim 1, wherein determining an estimate of an actual IF frequency response uses the set of conversion coefficients as weights to determine a weighted average of the IF response measurements for the overlapping frequency bands.

22. The method of claim 21, wherein determining the estimate of an actual IF frequency response comprises converting the measured IF responses to half-band measurements, and using a relationship given by an equation.

$$\hat{X}[k+(i-1)N] = \frac{1}{2}\left\{\frac{1}{a_{2i}}Z_{2i}[k+(i-1)N] + \frac{1}{a_{2i-1}}Z_{2i-1}[k+(i-1)N]\right\}; \quad (11)$$

$$\text{for } \begin{cases} k = 0, 1, 2, \ldots, N-1 \\ i = 1, 2, 3, \ldots \end{cases}$$

where $a_i$ are the conversion coefficients, $\hat{X}$ (k) is the actual frequency response estimate, $Z_i(k)$ are half-band IF response measurements, i is an index variable corresponding to an ith band of a measured IF response, k is an index for discrete frequency response measurement points within the ith band, and N is an integer representing the number of discrete frequency response measurement points measured in each ith band.

23. The method of claim 1, further comprising reducing an effect of a delay misalignment, the delay misalignment being a random-added delay in the IF responses measured at the overlapping frequency bands.

24. A method of characterizing an intermediate frequency (IF) response of a receiver comprising:
  determining an estimate of an actual IF response of the receiver from IF responses of the receiver under test measured for overlapping frequency bands and a set of conversion coefficients computed from the IF responses, such that the estimate reduces an effect of an uncertainty in knowledge of a radio frequency (RF) stimulus signal used in the IF response measurements; and
  removing a delay misalignment from either the IF responses measured for the overlapping frequency bands of half-band IF response measurements corresponding to the measured IF responses before the set of conversion coefficients are computed from the IF responses.

25. The method of claim 24, wherein removing a delay misalignment comprises finding a phase progression in a ratio of the measured IF responses from overlapping bands; multiplying the ratio by a complex conjugate of the phase progression to remove the phase progression; and optionally employing the ratio when the set of conversion coefficients is computed.

26. A method of characterizing an intermediate frequency (IF) response of a receiver to reduce an effect of stimulus signal uncertainty, the method comprising:
  measuring un IF response of a receiver at a plurality of overlapping frequency bands;
  computing a set of conversion coefficients from the F response measurements; and
  determining an estimate of an actual IF frequency response using the IF response measurements and the conversion coefficients, the estimate reducing the effect of stimulus signal uncertainty used in measuring;
  wherein each measured IF response of the receiver is a function of frequency, and
  is derived from measurements made at a plurality of frequencies within each of said overlapping frequency bands.

27. The method of claim 26, wherein measuring comprises averaging measurements of the IF frequency response at the overlapping frequency bands of the plurality.

28. The method of claim 26, further comprising:
  removing an effect of a radio frequency (RF) tilt in a magnitude response of an RF portion of the receiver.

29. A method of characterizing an intermediate frequency (IF) response of a receiver to reduce an effect of stimulus signal uncertainty, the method comprising:
  measuring an IF response of a receiver at a plurality of overlapping frequency bands;
  computing a set of conversion coefficients from the IF response measurements; and
  determining an estimate of an actual IF frequency response using the IF response measurements and the conversion coefficients, the estimate reducing the effect of stimulus signal uncertainty used in measuring;
  wherein the set of conversion coefficients is chosen to minimize a sum-square difference between the measured IF responses for the plurality of overlapping frequency bands.

30. An intermediate frequency (IF) measurement system that characterizes an IF response of a receiver under test, the system comprising:
  a signal generator that applies a radio frequency (RF) stimulus signal to the receiver under test;
  an IF processor that receives and digitizes an IF response from the receiver under test, the IF response being responsive to the applied RF stimulus signal;
  a controller that controls the signal generator, the receiver under test, and the IF processor, the controller processing the digitized IF response; and
  a computer program stored in memory and executed by the controller, the computer program comprising instructions that, when executed, implement determining an estimate of an actual IF response of the receiver under test from IF responses of the receiver under test measured at overlapping frequency bands and a set of conversion coefficients computed from the measured IF responses, such that the estimate reduces an effect of uncertainties in knowledge of the RF stimulus signal.

31. The IF measurement system of claim 30, wherein the instructions that implement determining an estimate comprises instructions that implement measuring the IF response of the receiver under test for each of the overlapping frequency bands; and computing the set of conversion coefficients from the measured IF responses.

32. The IF measurement system of claim 30, wherein the computer program further comprises instructions that, when executed, implement removing an RF tilt in a magnitude response of an RF portion of the receiver under test.

33. An intermediate frequency (IF) measurement system that characterizes an IF response of a receiver under test, the system comprising:
  a signal generator having an output, the signal generator producing a radio frequency (RF) stimulus signal at the signal generator output;
  an IF processor having an output, the IF processor producing an digitized IF response at the processor output;
  a controller having an input connected the processor output, a first output connected to an input of the signal generator, and a second output connected to a first input of the IF processor, the receiver under test being connected between a third output of the controller, the signal generator output, and a second input of the IF processor during characterization; and
  a computer program executed by the controller, the computer program comprising instructions that, when executed, determine an estimate of an actual IF response of the receiver under test from IF responses of the receiver under test measured at overlapping frequency bands and a set of conversion coefficients computed from the measured IF responses.

34. The IF measurement system of claim 33, wherein the signal generator comprises:.
- a baseband stimulus source;
- a transmitter baseband filter connected to an output of the baseband stimulus source;
- an up converter connected to an output of the transmitter baseband filter, the up converter comprising a tunable local oscillator; and
- a transmitter RF filter connected between the up converter and the signal generator output.

35. The IF measurement system of claim 33, wherein the signal generator comprises:
- an RF stimulus source; and
- a transmitter RE filter connected between an output of the RF stimulus source and the signal generator output.

36. The F measurement system of claim 33, wherein the IF processor comprises an analog-to-digital converter that converts an If output signal from an output of the receiver under test into a digitized IF response.

37. The IF measurement system of claim 33, wherein the controller is one or more of a general-purpose computer and a specialized processing engine or element.

38. The IF measurement system of claim 37, wherein the specialized processing engine or element comprises one or both of an embedded microprocessor and an embedded microcomputer.

39. The IF measurement system of claim 33, wherein the computer program is stored in one or both of memory of the controller and a computer readable media readable by the controller.

40. The IF measurement system of claim 33, wherein the computer program further comprises instructions that implement measuring the IF response of the receiver under test for the overlapping frequency bands; and instructions that implement computing the set of conversion coefficients from the measured F responses, and wherein the computer program optionally further comprises instructions that implements one or both of removing an RF tilt in a magnitude response of an RF portion of the receiver under rest and removing a delay misalignment from either the measured IF responses or half-band measurements corresponding to the measured IF responses prior to computing the set of conversion coefficients.

* * * * *